US012727526B2

(12) United States Patent
Müter et al.

(10) Patent No.: US 12,727,526 B2
(45) Date of Patent: Sep. 8, 2026

(54) STEERING METHOD FOR AN AGRICULTURAL MACHINE

(71) Applicants: KRONE AGRICULTURE SE, Spelle (DE); LEMKEN GMBH & CO. KG, Alpen (DE)

(72) Inventors: Matthias Müter, Bonn (DE); Alexander Grever, Osnabrück (DE); Stefan Menke, Südlohn (DE)

(73) Assignees: KRONE AGRICULTURE SE, Spelle (DE); LEMKEN GMBH & CO. KG, Alpen (DE)

( * ) Notice: Subject to any disclaimer, the term of this patent is extended or adjusted under 35 U.S.C. 154(b) by 103 days.

(21) Appl. No.: 18/352,589

(22) Filed: Jul. 14, 2023

(65) Prior Publication Data

US 2024/0016076 A1 Jan. 18, 2024

(30) Foreign Application Priority Data

Jul. 18, 2022 (DE) ........................ 102022117884.6

(51) Int. Cl.
*G05D 1/00* (2024.01)
*A01B 69/04* (2006.01)

(52) U.S. Cl.
CPC ......... *A01B 69/008* (2013.01); *G05D 1/0223* (2013.01)

(58) Field of Classification Search
None
See application file for complete search history.

(56) References Cited

U.S. PATENT DOCUMENTS 8,639,416 B2 * 1/2014 Jones ...................... G01S 19/04 701/41
8,874,355 B2 * 10/2014 Pieper .................. G05D 1/0214 701/422

(Continued)

FOREIGN PATENT DOCUMENTS

EP 1419683 B1 * 1/2007 ........... A01B 69/008
EP 2221702 A2 * 8/2010 ........... A01B 69/007

OTHER PUBLICATIONS

Extended European Search Report in EP23185323.5, mailed Dec. 21, 2023, 10 pages.

*Primary Examiner* — Redhwan K Mawari
*Assistant Examiner* — Nada Mahyoob Alqaderi
(74) *Attorney, Agent, or Firm* — McKee, Voorhees & Sease, PLC

(57) ABSTRACT

A steering method for an agricultural machine (10) follows a guide vehicle (30) driving along a guide lane (RF) during a road trip. This includes inertial measurements (MA1, MA2, MA3) that correspond to a multidimensional acceleration (S120) by at least one inertial measuring or sensing device (11, 31, 41), where first inertial measurements (MA1) are determined by a first inertial measuring or sensing device (11) on the agricultural machine (10) at least first kinematics data based on the first inertial measurements (MA1) and kinematics of the agricultural machine (10) are determined (S140), lane information is partly based on the determined inertial measurements (MA1, M A2, M A3) and the guide vehicle (20) is determined (S160) and the first kinematics data are compared (200) against, steering commands (L1, L2) are automatically determined (S220) for at least one steerable axle (14, 15) of the agricultural machine (10).

15 Claims, 4 Drawing Sheets

(56) References Cited

U.S. PATENT DOCUMENTS

| | | | | |
|---|---|---|---|---|
| 10,123,472 | B1 * | 11/2018 | Schneider | G01C 21/1654 |
| 2018/0001928 | A1 * | 1/2018 | Lavoie | B62D 15/021 |
| 2020/0150686 | A1 * | 5/2020 | Wieschemann | G05D 1/0212 |
| 2020/0207412 | A1 * | 7/2020 | Al Assad | B62D 15/0245 |
| 2021/0188240 | A1 * | 6/2021 | Wolff | B60W 10/20 |

* cited by examiner 50
10
11,12
19
18
15
13
14
16
44
17
40
43
41,42
33
31,32
1
30
34
$R_F$
51

50
$R_B, R_S$
$R_I$
$R_F$
51
51
50

STEERING METHOD FOR AN AGRICULTURAL MACHINE

CROSS REFERENCE TO RELATED APPLICATIONS

This application claims priority under 35 U.S.C. § 119 to German Patent Application DE 10 2022 117 884.6, filed Jul. 18, 2022, which is herein incorporated by reference in its entirety, including without limitation, the specification, claims, and abstract, as well as any figures, tables, appendices, or drawings thereof.

FIELD OF THE INVENTION

The present invention relates to a steering method for an agricultural machine.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

On the one hand, an agricultural machine that is pulled by a tractor during field cultivation has been known for a long time, and on the other hand, self-propelled agricultural machines that are controlled by a driver during field cultivation. These machines can also be moved in the same way during transfer journeys or road journeys, i.e., on the way to or from the field, i.e., either pulled by the tractor or steered by the driver in a self-propelled manner. In the case of towed agricultural machines, the brake is supplied with energy and controlled from the towing vehicle. If present, this also applies to steerable axles of the towed agricultural machine. In addition, autonomously operating agricultural machines are increasingly being used, which have their own drive and steering and carry out field cultivation independently, without the control commands of a driver. Since these vehicles cannot carry out a transfer journey autonomously in road traffic, they have to be loaded onto a low-loader, for example, which is time-consuming and increases the costs for the entire operation.

A possible alternative is to couple to a towing vehicle, but this, in turn, can have other disadvantages. The agricultural machine can be hitched so that, for example, one axle is lifted off the ground, which in turn leads to a greater load on the other axle(s) and possibly exceeding a permissible axle load. In addition, active steering of the axle(s) in contact with the ground is desirable when transporting the vehicle in a semi-trailer manner, otherwise the agricultural machine will cut across bends, intersection corners, etc. The corresponding steering can be realized by means of a mechanical coupling to the towing vehicle, which however, in turn, means increased complexity.

Therefore, there is a strong need to have an agricultural machine to follow a guide vehicle as precisely as possible during a road trip with little technical effort.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

The objective of the invention is to enable an agricultural machine to follow a guide vehicle as precisely as possible during a road trip with little technical effort. This objective is achieved by means of a steering method having the features of the independent claim 1. Advantageous embodiments can be derived from the dependent claims.

For this purpose, a steering method is created for an agricultural machine which follows a guide vehicle that drives along a guide lane during a road trip, wherein: at least one inertial measuring device is used to obtain inertial measurements corresponding at least to a multidimensional acceleration, wherein the first inertial measurements are determined by a first inertial measuring device arranged on the agricultural machine, wherein first kinematics data based at least on the first inertial measurements and that describe the kinematics of the agricultural machine are determined, lane information relating to the guide vehicle is determined at least in partly on the basis of the inertial measurements obtained, and the first kinematics data are compared with this, depending on the result of the comparison, steering commands are automatically determined for at least one steerable axle of the agricultural machine in order to steer the agricultural machine in a manner adapted to the guide lane, and the agricultural machine is automatically steered by the steering commands.

The agricultural machine can also be referred to as an agricultural working machine. In particular, it can be a harvester such as a forage harvester, a combine harvester, a baler, or a loader wagon. But it could also be, for example, a tedder, a plough, a fertilizer spreader, a slurry tanker, or the like. The agricultural machine is set up for field cultivation, for example, for ploughing, fertilizing, mowing, tedding, harvesting, or the like. The agricultural machine can be a trailer that is towed by a tractor during field cultivation. In this case, it is also towed during a road trip or transfer trip. However, the agricultural machine can also have its own drive, which drives it both when working in the field and while driving on the road. It can be in the form of an autonomous vehicle that is set up to perform field work without the control commands of a driver or operator. However, it would also be conceivable that the agricultural machine has a control station or a driver's cab and can be controlled by a driver if necessary. In the course of the steering method according to the invention, however, automatic steering takes place, as will be explained below.

With the method according to the invention, the agricultural machine follows a guide vehicle that drives along a guide lane during a road trip. The term "road trip" is not to be interpreted strictly here and also refers to driving on unpaved roads. It is used here synonymously with "transfer trip", i.e., it refers to a journey from or to the place of use. The guide vehicle can itself be an agricultural machine, but it can also be another vehicle, for example, a truck. Normally, the guide vehicle is a motor vehicle with its own drive, but it could also be, for example, a trailer without its own drive, which in turn is towed. It can be a vehicle driven by a driver or an autonomous vehicle. The guide vehicle travels along a route or lane, which is referred to here and hereafter as the guide lane. The guide lane may depend on short-term steering actions by a driver or an autonomous steering system and is subject to potentially constant change.

It can, therefore, only be predicted for the future to a limited extent. The agricultural machine follows the guide vehicle, which generally means that the guide vehicle drives in front and the agricultural machine drives behind the guide vehicle. As will be explained below, this does not necessarily mean that the agricultural machine also drives along the guide lane.

According to one step of the method, at least one inertial measuring device will obtain inertial measurements corresponding at least to a multidimensional acceleration, wherein first inertial measurements are determined by a first inertial measuring device arranged on the agricultural machine, and first kinematics data describing the kinematics of the agricultural machine are determined at least based on the first inertial measurements. The respective inertial measuring device is set up to determine inertial measurements. These inertial measurements correspond at least to a multidimensional acceleration, which includes both two-dimensional and three-dimensional accelerations. In addition to (translational) acceleration, the inertial measuring device can also measure angular acceleration, i.e., a change against time of an angular velocity, as part of the inertial measurements. The inertial measuring device preferably has at least one initial measuring unit, which for the sake of simplicity is referred to below with the abbreviation IMU (Inertial Measurement Unit). A first inertial measuring device is arranged on the agricultural machine and can be firmly attached to a frame of the agricultural machine, for example. This first inertial measuring device determines the first inertial measurements. The designation "first inertial measurements" is for differentiation purposes only and does not imply a ranking or the presence of other inertial measurements. The first inertial measurements correspond at least to a multidimensional acceleration of the agricultural machine.

At least based on these first inertial measurements, the first kinematics data are determined that describe the kinematics of the agricultural machine. In some cases, the first kinematics data can also be identical to the first inertial measurements or are related to them in a trivial way. In particular, however, a calculation of the first kinematics data can be carried out, which is at least partly based on the first inertial measurements. In particular, it can be an integration against time to determine a velocity and, if appropriate, a position from the multidimensional acceleration, wherein initial values must be specified that do not result from the integration. In any case, the kinematics of the agricultural machine are described, i.e., the movement of the agricultural machine and/or its current spatial arrangement. The first kinematics data can be determined by a control unit. In particular, this control unit can be arranged on the agricultural machine, but it could also be arranged, for example, on the guide vehicle or elsewhere. It can also have multiple, spatially separated components. Functions of the control unit can be partly implemented by software. The control unit can receive inertial measurements wirelessly or by wire from at least one inertial measuring device and other data if appropriate.

Furthermore, at least partly based on the determined inertial measurements, lane information relating to the guide vehicle is determined and the first kinematics data are compared with this. This step of the method can also be carried out by the control unit. The lane information relates to the guide vehicle and is therefore related to the guide lane. However, it does not usually allow an exact description of the guide lane, for example, due to measurement errors within the inertial measurements, numerical inaccuracies, or other influences. In any case, the guide lane can be characterized at least to a limited extent and approximately on the basis of the lane information. This lane information can be used to compare the first kinematics data obtained. This comparison provides an indication of how the agricultural machine is positioned in relation to the guide lane and/or how it moves in relation to the guide lane. Since the guide lane is generally not known exactly, the result of the comparison is inevitably also generally not exact. However, certain inaccuracies are acceptable and do not jeopardize the functional principle of the steering method according to the invention.

In a further step of the method, depending on the result of the comparison, steering commands are automatically determined for at least one steerable axle of the agricultural machine in order to steer the agricultural machine in a manner adapted to the guide lane. This step of the method can, in turn, be carried out by the control unit. The agricultural machine may have one or more steerable axles. The respective axle can be steered by at least one actuator, wherein the actual steering angle can be checked by an assigned sensor. In the case of multiple steerable axles, steering commands can be determined for all axles. Alternatively, however, it is also conceivable that, for example, only the front or frontmost axle is steered, while the rear axle(s) remain locked in a straight line. The steering commands can be digital or analogue signals. In any case, a steering command contains information about the respective steering angle of the steerable axle. The steering commands are determined in order to steer the agricultural machine in a manner adapted to the guide lane. According to one embodiment, the goal can be for the agricultural machine to follow the guide lane as closely as possible. According to a different embodiment, it may be provided, for example, that the agricultural machine drives laterally offset to the guide lane in a bend. In principle, other designs are also conceivable, wherein, however, the steering of the agricultural machine is always based on the guide lane. The steering commands are determined depending on the result of the comparison. This means that a decision is made on the basis of the comparison as to how the agricultural machine is to be steered based on the first kinematics data obtained in order to achieve or maintain the intended adaptation to the guide lane (as far as it is known from the lane information).

In a further step, the agricultural machine is automatically steered by the steering commands. This can also be done by the aforementioned control unit, which for this purpose can be connected wirelessly or by wire to at least one steering actuator assigned to at least one steerable axle.

The advantage of the steering method according to the invention lies in the at least predominant, possibly even exclusive, use of at least one inertial measuring device in order to obtain the measurements necessary for steering the agricultural machine. As described above, the respective inertial measuring device can be implemented with one or more IMUs, which are cost-effective on the one hand and extremely robust on the other hand. The latter property, in particular, is of particular importance, especially since the agricultural machine may be exposed to greater loads and harsher operating conditions than a passenger car, for example. More sensitive sensor types could be damaged or otherwise impaired here.

One embodiment provides that the determined lane information corresponds to a calculated lane of the guide vehicle and that the first kinematic data correspond to an actual lane of the agricultural machine, wherein the actual lane is compared with a target lane derived from the calculated lane and the steering commands are determined depending on the result of the comparison. Ideally, the calculated lane would be identical to the guide lane or to a section of it. In reality, there is generally a deviation from the guide lane, but this is acceptable within certain limits. The calculated lane can be determined up to the current point in time, but it can also be extrapolated into the future for a certain period of time. The actual lane is either part of the first kinematics data, which are determined based on the first inertial measurements, or it is identical to these first kinematics data. Here, too, there may be a deviation between the actual lane and the actually travelled lane of the agricultural machine due to measurement errors, numerical errors, and other influences, but this is also acceptable within certain limits. The actual lane can also be determined up to the current point in time or may be extrapolated into the future for some time. In the latter case, it can be assumed, for example, that the steering angle of at least one steerable axle is not changed compared to the current state. A target lane derived from the calculated lane will be determined for the agricultural machine. It can be identical to the calculated lane, but can also deviate from it in foreseen ways, for example, to realize a lateral offset in a bend. By comparing the target lane with the actual lane, it is possible to determine how the agricultural machine must be steered in order to move in the intended manner relative to the guide vehicle. Since the target lane is derived from the calculated lane, an (indirect) comparison with the calculated lane also takes place. The steering commands are then determined according to a possible deviation of the actual lane from the target lane.

According to one embodiment, the agricultural machine is mechanically decoupled from the guide vehicle. In this case, there is no mechanical connection between the two vehicles. Another design provides that the agricultural machine is connected to the guide vehicle by a tension and pressure-transmitting coupling rod, wherein the coupling rod is pivotably connected to both the guide vehicle and the agricultural machine. The coupling rod can normally be regarded as a rigid body, although it is possible that there is a slight elastic deformation of the coupling rod even during normal operation, for example. In any case, the coupling rod does not have any flexible areas or joints. In principle, a design would be conceivable in which the coupling rod consists of two telescopically connected parts, between which a spring element is introduced. In this way, expansion or compression of the coupling rod parallel to its length would be possible. The coupling rod connects the guide vehicle to the agricultural machine. It can act as a tow rod in the true sense of the word, in such a way that the guide vehicle tows the agricultural machine. In this embodiment, the latter usually does not have its own traction drive. In this case, the guide vehicle can also be referred to as a towing vehicle, towing machine, tractor, or the like. Optionally, it can operate a brake system of the agricultural machine and/or supply the agricultural machine with energy, for example. However, embodiments are also conceivable in which the agricultural machine drives with its own traction drive. In any case, the coupling rod is connected on both sides in a pivotable manner, wherein at least a one-dimensional pivotability is provided, i.e., a pivotability by a one-dimensional angle in the horizontal plane. In addition, there is usually at least limited pivotability in the vertical direction, so that two-dimensional pivotability can be referred to. The coupling rod can be pivoted free of restoring forces, but it would also be possible for it to be connected to the guide vehicle and/or to the agricultural machine by means of at least one spring element.

Depending on the embodiment, the first inertial measuring device arranged on the agricultural machine may be sufficient to obtain the necessary inertial measurements to determine the lane information as well as the first kinematics data. For example, if there is a coupling rod present, lane information can be derived from the transmitted forces and the resulting accelerations of the agricultural machine. If the guide vehicle is cornering, the agricultural machine experiences lateral force via the coupling rod, which leads to lateral acceleration, for example, due to the compliance of the chassis. This means that it is possible to draw conclusions about the lane of the guide vehicle solely by means of inertial measurements on the agricultural machine. In other embodiments, an additional inertial measuring device not arranged on the agricultural machine may be used. Such an embodiment provides that second inertial measurements are determined by a second inertial measuring device arranged on the guide vehicle and that the lane information is determined at least partly on the basis of the second inertial measurements. Of course, the second inertial measurements relate to the guide vehicle. They may, for example, correspond to an acceleration as well as an angular acceleration of the guide vehicle. From these second inertial measurements, for example, the velocity, angular velocity, location, and orientation can be calculated by (numerical) integration against time. Thus, in principle, it is possible to determine the lane of the guide vehicle solely on the basis of the second inertial measurements (with the addition of initial values). The second inertial measurements determined by the second inertial measuring device can be transmitted wirelessly or by wire to the aforementioned control unit.

Preferably, second kinematics data, at least based on the second inertial measurements and that describe the kinematics of the guide vehicle, are determined. The second kinematics data are at least partly based on the second inertial measurements, i.e., they can either be calculated using the second inertial measurements or may be identical to them. The complete description of the kinematics of the guide vehicle allows a complete description of the lane. This means that the lane information can be given in whole or in part by the second kinematics data of the guide vehicle. In particular, the second kinematics data can correspond to the aforementioned calculated lane.

Preferably, kinematics data describing a location, velocity, acceleration, orientation, angular velocity and/or angular acceleration are determined. This relates to the first kinematics data as well as to the second kinematics data. In particular, the respective kinematics data can describe all six of the mentioned variables. The variables mentioned are classically associated with the concept of kinematics and describe the position, including the orientation, as well as the change with time of the same. The velocity and acceleration correspond to the first and second time derivatives of the location. Each of the variables mentioned is usually at least a two-dimensional variable, possibly also a three-dimensional variable. A two-dimensional location can be characterized by an X and a Y coordinate, and a three-dimensional location additionally by a Z coordinate. The angular velocity and angular acceleration correspond to the first and second time derivatives of the orientation. Each of these variables is at least one-dimensional, as far as an orientation, etc., is considered within a plane. However, two- or three-dimensional orientations, etc., can be considered, which can be characterized by two or three angles. An example would be yaw angle, roll angle, and pitch angle.

According to a preferred embodiment, a third inertial measuring device arranged on the coupling rod determines third inertial measurements and the lane information is determined at least in part based on the third inertial measurements. The third inertial measuring device is usually rigidly connected to the coupling rod. The third inertial measurements supplied by it allow conclusions to be drawn about the movement of the coupling rod, which in turn depends on the movement of the guide vehicle relative to the agricultural machine. The designation "third" inertial measuring device is for distinguishing purposes only and does not imply that the second inertial measuring device described above must be arranged on the guide vehicle at the same time. In fact, the third inertial measuring device is typically provided as an alternative to the second inertial measuring device.

In particular, if no (second) inertial measuring device is arranged on the guide vehicle, it may be useful to first determine a trajectory of the coupling rod and to infer the lane based on this. Such an embodiment provides that trajectory information about a trajectory of the coupling rod is determined at least partly on the basis of the third inertial measurement values and that the lane information is at least partly based on the trajectory information. The trajectory of the coupling rod can be determined in the same way as the calculated lane of the guide vehicle. If this trajectory is known, it is possible to draw conclusions about the calculated lane, wherein the information that the coupling rod is connected to the guide vehicle is implicitly used.

As a rule, the lane information and/or first kinematics data are determined in part based on geometry data describing a geometry of the guide vehicle, coupling rod and/or agricultural machine. Such geometry data can correspond, for example, to a length of the guide vehicle, the coupling rod and/or the agricultural machine, or to a wheelbase, a track width, or other characteristics. It can also be information about the relative position of certain components of a vehicle, for example, the relative position of two sensors to each other. If the lane information is based on the aforementioned trajectory information, the latter can be determined based on geometry data. The corresponding geometry data can be stored in the control unit that performs the corresponding calculations or can be transmitted to the control unit from an external source. For example, the orientation of the coupling rod can be used to infer the position of a pivot point on the guide vehicle if the length of the coupling rod and the position of a pivot point on the agricultural machine are known. In order to determine the latter, information about the geometry of the agricultural machine can be used. For example, the currently determined orientation of the agricultural machine can be used in combination with the relative position of the pivot point relative to the position of the first inertial measuring device.

Under certain circumstances, it may be useful to use other sensors in addition to at least one inertial measuring device. These can be used as a safeguard in the event of an inertial measurement device failing and/or they can provide readings that are compared with the inertial measurements to enable error correction. One embodiment provides that the lane information and/or the first kinematics data are determined in addition to the inertial measurements in part based on measurements from at least one additional sensor. The additional sensor is usually arranged on the agricultural machine, on the guide vehicle or, if present, on the coupling rod. In principle, however, a sensor that is external with regard to the vehicle group would also be conceivable. In this context, an "additional sensor" is a sensor that is based on a different measuring principle than at least one inertial measuring device. The additional sensor usually does not measure acceleration either. Normally, the inertial measurements and the measurements of the additional sensor are used at the same time, but it would also be conceivable that the measurements of the additional sensor are only used intermittently instead of the inertial measurements.

If the agricultural machine is coupled to the guide vehicle by means of a coupling rod, at least one additional sensor may be in the form of an angle sensor, which determines angle measurements corresponding to an angle of the coupling rod relative to the guide vehicle and/or the agricultural machine. It should be understood that both an angle sensor can be used to measure the relative angle between the coupling rod and the guide vehicle and an angle sensor can be used to measure the relative angle between the coupling rod and the agricultural machine. The term "relative angle" includes both a one-dimensional angle measurement, with which only how far the coupling rod pivots horizontally to the left and right is determined, and a two-dimensional angle measurement, with which how far the coupling rod pivots vertically upwards and downwards is also determined.

The lane information can be determined at least partly based on angle measurements determined by an angle sensor. The angle measurements can be used to determine the orientation of the coupling rod relative to the guide vehicle and/or sometimes the agricultural machine with high precision. Taking into account the geometric dimensions of the coupling rod, the position of a pivot point on the guide vehicle can thus be determined, for example, based on the position and orientation of the agricultural machine, without having to resort to sensors on the guide vehicle. This information can be combined with other sensor data to understand the position and/or movement of the guide vehicle as a whole.

A preferred embodiment provides that at least one additional sensor is in the form of an orientation sensor that determines orientation measurements that correspond to an orientation of the agricultural machine, the coupling rod and/or the guide vehicle relative to the surroundings of the same. Whereas, for example, an IMU can only provide information about a change in orientation, the orientation sensor can measure the orientation as such. To a certain extent, this is an "absolute" orientation indication relative to the surroundings. In two dimensions, the orientation indication corresponds to a cardinal direction, for example. Such an orientation can be determined, for example, by means of a gyrocompass, which is a reliable solution in principle, but cost-intensive. More cost-effective, although possibly susceptible to interference, would be a magnetometer that uses the Earth's magnetic field to measure orientation. Physically, such a magnetometer can also be integrated into an IMU if appropriate. Regardless of the underlying design and measurement principle, a compromise can be found between the accuracy of the sensor unit and the costs incurred.

The inertial measuring devices do not allow direct position measurement or direct measurement of a distance travelled. This information can only be obtained by integrating the accelerations twice (numerically), which can generally lead to numerical errors that increase over time. According to one design, this disadvantage can be compensated for by the fact that an additional sensor is in the form of a distance sensor, which determines distance measurements that correspond to a distance travelled by the agricultural machine and/or the guide vehicle. The distance sensor can also be referred to as an odometer and the distance readings can be referred to as odometry data. This usually involves measuring the number of revolutions of a wheel and multiplying it by its known rolling circumference to determine the distance travelled. Such a distance sensor may be arranged on the agricultural machine and/or on the guide vehicle.

In particular, but not exclusively, if the agricultural machine is not connected to the guide vehicle by a coupling rod, it may be useful to check the relative position of the two vehicles by means of additional sensors. Accordingly, an advantageous embodiment provides that at least one additional sensor is in the form of a position sensor arranged on the agricultural machine, which determines position readings corresponding to a position of the guide vehicle relative to the agricultural machine. The position sensor can be in the form of an ultrasonic sensor, radar sensor, or lidar sensor, for example. It can also be in the form of a camera (which may also be sensitive to infrared), wherein image recognition is used to identify certain structures on the guide vehicle and to detect the relative position from the arrangement and apparent size thereof within the camera image. For this purpose, of course, information about the geometry of the guide vehicle must be stored by a corresponding evaluation unit. Of course, different types of position sensors can also be combined with each other. In general, the at least one position sensor can also be used to compensate for a possible drift of at least one inertial measuring device. Alternatively, or additionally, at least one position sensor could also be arranged on the guide vehicle.

Although typical commercially available IMUs are robust and cost-effective, they may be prone to measurement errors of different origins. For example, there may be a drift of the measurements supplied, which makes the measurements increasingly unreliable over time. These and other measurement errors can be countered by the principle of redundancy. One embodiment provides that at least one inertial measuring device has a plurality of inertial measuring units that provide redundant measurements, wherein discrepancies occurring between these measurements are used for error correction. Not all measurements have to be redundant to each other, but this is true for at least some. A plurality of measurements is redundant if, in the absence of measurement errors, one of the measurements could be accurately predicted if at least one other measurement (possibly also several other measurements) were known. For example, two IMUs located at a distance from each other on the agricultural machine should provide identical values for the angular acceleration of the agricultural machine. The same applies to the acceleration of the agricultural machine when driving straight ahead. If the IMUs are oriented differently within the agricultural machine, this naturally affects the values determined internally by the IMU, but only causes, for example, a different assignment in the IMU's internal coordinate system. Deviations that cannot be explained by the different installation position and orientation indicate a measurement error in at least one IMU. In this case, there are different correction methods for determining a value from the inconsistent measurements that is likely to be close to the true value. With redundancy the low acquisition costs of an IMU again come into effect. The integration of three, four or five IMUs in an inertial measuring device has only a negligible effect on the total price of an agricultural machine equipped with these, for example.

The objective is further achieved with a control device for an agricultural machine, which is set up to follow a guide vehicle during a road trip driving along a guide lane, wherein the control device is set up: to determine, by means of at least one inertial measuring device, inertial measurements that correspond to at least one multidimensional acceleration, wherein first inertial measurements are determined by a first inertial measuring device arranged on the agricultural machine, wherein first kinematics data at least based on the first inertial measurements and describing the kinematics of the agricultural machine are determined, at least partly based on the determined inertial measurements, to determine lane information relating to the guide vehicle and to compare the first kinematics data with this, depending on the result of the comparison, to automatically determine steering commands for at least one steerable axle of the agricultural machine in order to steer the agricultural machine in a manner adapted to the guide lane, and to steer the agricultural machine automatically by the steering commands.

The terms mentioned have already been explained above with reference to the steering method according to the invention and are therefore not explained again. Advantageous embodiments of the control device according to the invention correspond to those of the steering method according to the invention.

The control device usually has a plurality of components, which can be spatially separated from each other. In particular, it may have at least one inertial measuring device and a spatially separate control unit. At least one actuator by which the at least one axle is steered can also be regarded as part of the control device. The control device may be arranged exclusively on the agricultural machine, but it may also be partly arranged on the guide vehicle or, if present, on the coupling rod. It would also be possible for parts of the control device to be arranged outside the vehicle group consisting of the guide vehicle and the agricultural machine. For example, a control unit could be stationary or arranged on another vehicle that is following or driving ahead of the vehicle group, for example. In such a case, the control unit can communicate wirelessly with at least one inertial measuring device and other components of the control device.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

The invention is described below based on figures. The figures are merely exemplary and do not limit the general idea of the invention. In the figures.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
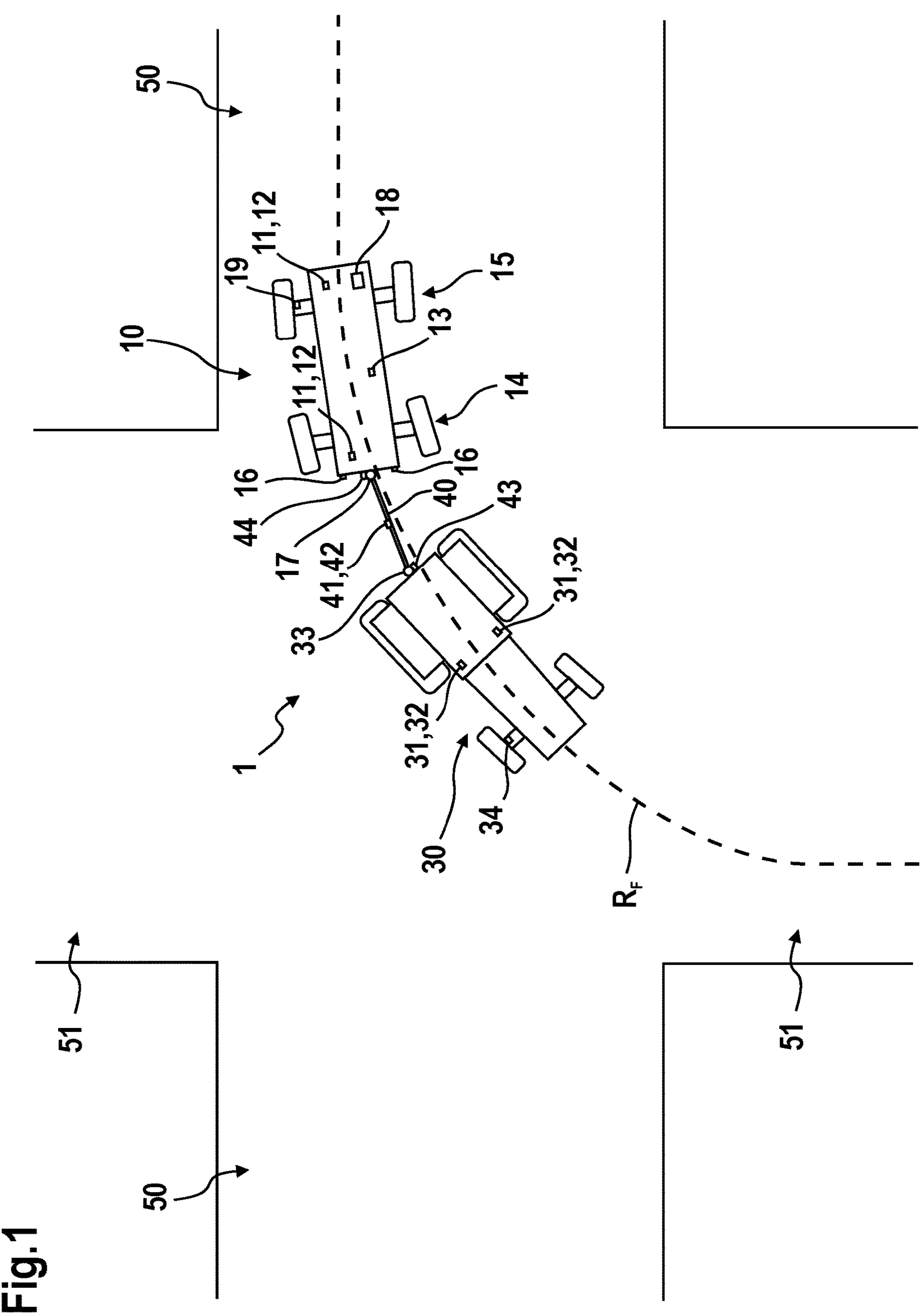
FIG. 1 shows a plan view of a road intersection as well as a guide vehicle and an agricultural machine with a control device according to the invention.

FIG. 1 shows a plan view of a road intersection with a first road 50 and a second road 51. A combination of a guide vehicle 30 and an agricultural machine 10 coupled to it by a coupling rod 40 is about to turn from the first road 50 into the second road 51. The guide vehicle 30, which is shown as a tractor in this example, is driving along a guide lane $R_F$, which is shown in FIGS. 1 and 3 as a long-dashed line. The agricultural machine 10 has a front axle 14 and a rear axle 15, which can be actively steered by means of a front steering actuator 20 and a rear steering actuator 21 respectively (shown in the block diagram in FIG. 2). The coupling rod 40 is pivotably connected to the guide vehicle 30 at a front pivot point 33 and is pivotably connected to the agricultural machine 10 at a rear pivot point 17. At the pivot points 17 and 33 mentioned above, it can be pivoted freely and otherwise only transmits tensile and compressive forces parallel to its orientation. No steering commands are transmitted from the guide vehicle 30 to the agricultural machine 10.

Figure 2:
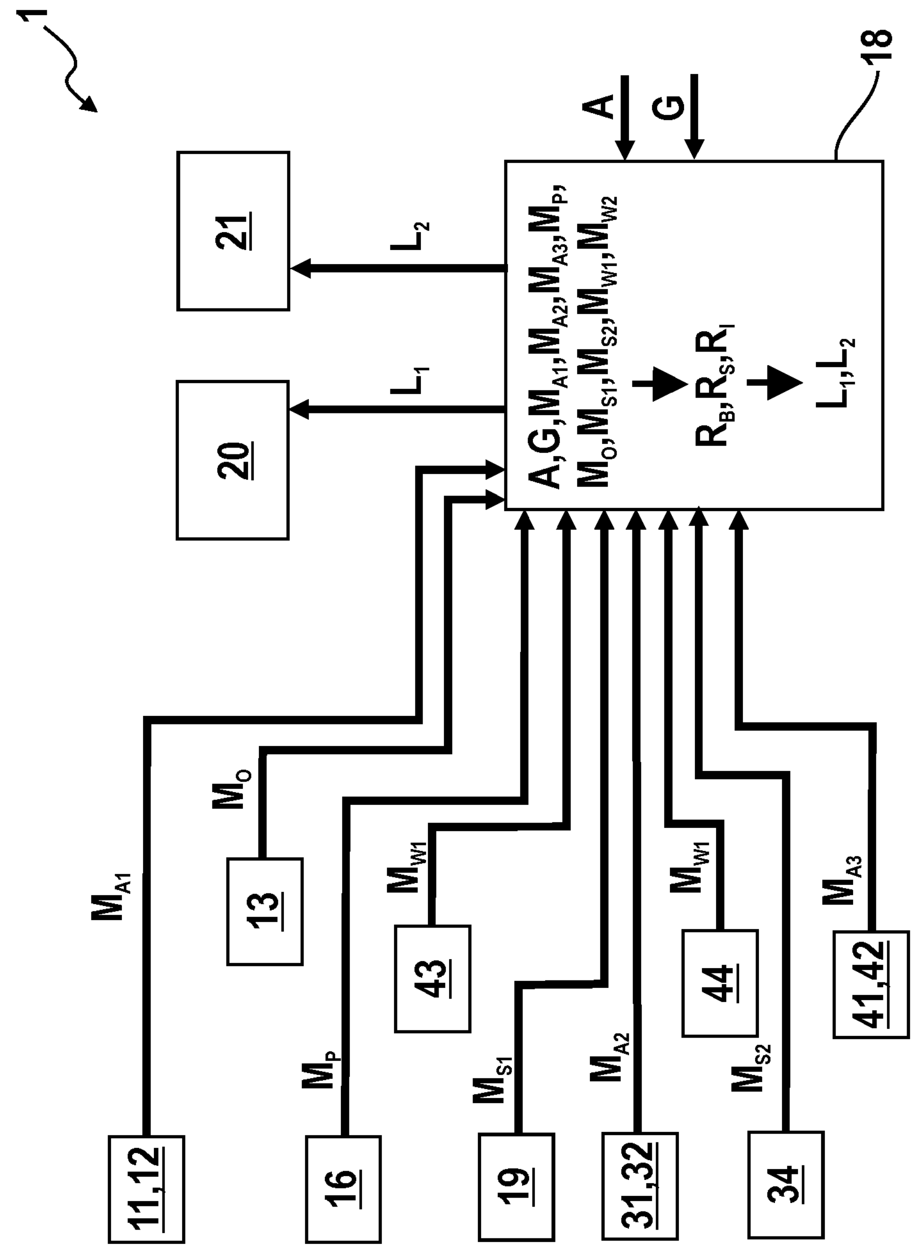
FIG. 2 shows a block diagram of components of the control device, as well as information transmitted between them.
Figure 3:
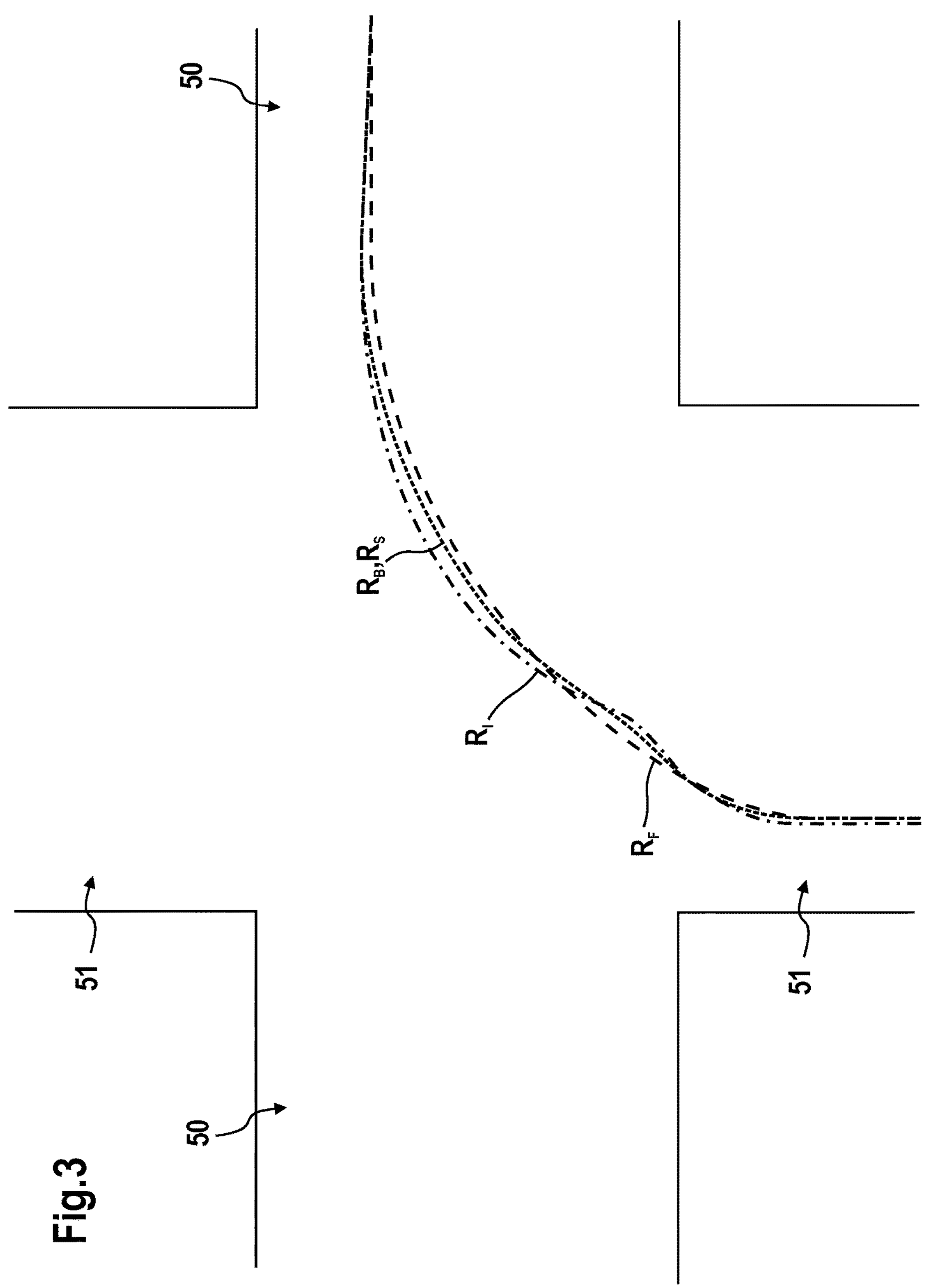
FIG. 3 shows a plan view of the road intersection with different lanes.

In order to be able to steer the axles 14, 15 of the agricultural machine 10 in such a way that it follows the guide vehicle 30 in the intended manner, a control device 1 is provided, the components of which are shown together in the block diagram in FIG. 2. Essential components of the control device 1 are a control unit 18, which is arranged on the agricultural machine 10 and a first inertial measuring or sensing device 11, which in this case has two IMUs 12 spaced apart. The IMUs 12 transmit to the control unit 18 first inertial measurements $M_{A1}$, which correspond to multidimensional acceleration and multidimensional angular acceleration. The first inertial measurements $M_{A1}$ received from the two IMUs 12 are, in principle, mutually redundant, which is used to perform a comparison and to correct possible measurement errors. Optionally, the agricultural machine 10 may have one or more additional sensors 13, 16, 19. For example, an orientation sensor 13, which can be in the form of a magnetometer, can be used to determine orientation measurements $M_O$ that correspond to an orientation, i.e., a spatial orientation, of the agricultural machine 10. Position sensors 16 can determine position readings $M_P$ corresponding to a position of the guide vehicle 30 relative to the agricultural machine 10. These position sensors 16 could, for example, be in the form of radar or lidar sensors. Finally, a first distance sensor 19, which can also be referred to as an odometer, can determine the first distance measurements $M_{S1}$ that correspond to a distance travelled by the agricultural machine 10.

The guide vehicle 30 has a second inertial measuring or sensing device 31, which also has two IMUs 32 spaced apart. The IMUs 32 transmit to the control unit 18 (for example wirelessly) second inertial measurements $M_{A2}$, which correspond to a multidimensional acceleration and a multidimensional angular acceleration. Also shown is a second distance sensor 34, which determines the second distance measurements $M_{S2}$, which correspond to a distance travelled by the guide vehicle 30.

The coupling rod 40 has a third inertial measuring or sensing device 41, which in this case is formed by a single IMU 42. The IMU 42 transmits to the control unit 18 (for example wirelessly) third inertial measurements $M_{A3}$, which in turn correspond to a multidimensional acceleration and a multidimensional angular acceleration. In addition, a first angle sensor 43 is arranged at the front pivot point 33. This determines the first angle measurements $M_{W1}$, which correspond to a pivot angle of the coupling rod 40 relative to the guide vehicle 30. A second angle sensor 44 arranged at the rear pivot point 17 determines second angle measurements $M_{W2}$, which correspond to a pivot angle of the coupling rod 40 relative to the agricultural machine 10. The angle measurements $M_{W1}$, $M_{W2}$ can also be transmitted wirelessly to the control unit 18.

FIGS. 1 and 2 show a plurality of sensors that are not normally used together. Rather, the figures serve to illustrate different options. In particular, in practice, three alternative configurations of inertial measuring or sensing devices 11, 31, 41 are usually significant. According to a first option, only the first inertial measuring or sensing device 11 is provided. According to a second option, the first inertial measuring or sensing device 11 and the second inertial measuring or sensing device 31, and according to a third option, the first inertial measuring or sensing device 11 and the third inertial measuring or sensing device 41. In connection with the second option, it is also expressly possible that the coupling rod 40 is omitted, so that there is no mechanical connection between the guide vehicle 30 and the agricultural machine 10 following it. The other additional sensors 13, 16, 19, 34, 43, 44 apart from the inertial measuring or sensing device shown in 11, 31, 41 are generally to be regarded as optional. However, the addition of one or more of these additional sensors 13, 16, 19, 34, 43, 44 is useful in many cases in order to improve the precision of the control device 1. This is especially true if there is no coupling rod 40.

Figure 4:
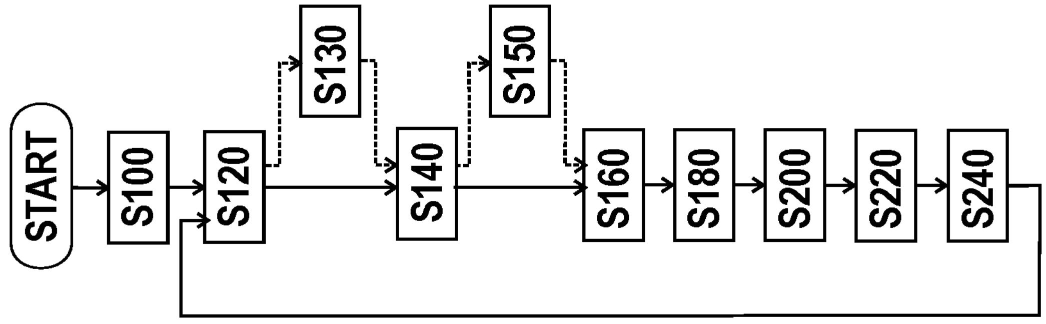
FIG. 4 shows a flow diagram of a steering method according to the invention for steering the agricultural machine from FIG. 1.

The control device 1 carries out a steering method according to the invention, which is now illustrated with reference to the flowchart in FIG. 4 and, in addition, with reference to FIGS. 2 and 3. In a first step S100, an initialization of the control unit 18 takes place, during which geometry data G of the agricultural machine 10, the guide vehicle 30, and the coupling rod 40 are loaded. As already mentioned, the coupling rod 40 can optionally be omitted, so that no geometry data in this regard are loaded. In the following, the option to omit the coupling rod 40 is not mentioned every time. The geometry data G can describe different aspects of the geometry, for example, length, width, wheelbase, track width, arrangement of pivot points 17, 33, etc. In addition, initial values A are determined, in particular, the initial position and orientation of the agricultural machine 10, the guide vehicle 30, and the coupling rod 40, the velocities and angular velocities thereof. The latter are usually zero since initialization typically takes place at a standstill. The initial position of the agricultural machine 10 can be chosen as the coordinate origin or initialized with a different default value, and the orientation thereof can be initialized with an angle of 0° or another default value.

However, it would also be possible to determine the orientation by means of the orientation sensor 13. The position and orientation of the coupling rod 40 can, for example, be determined by means of the rear angle sensor 44 in combination with the known geometry of the coupling rod 40. The position and orientation of the guide vehicle 30 can be determined by means of both angle sensors 43, 44 in combination with the geometry data of the coupling rod 40 and the guide vehicle 30. Alternatively, or to improve accuracy, the position sensors 16 could also be used.

After the initialization, the first inertial measurements $M_{A1}$ and optionally the second inertial measurements $M_{A2}$ and/or the third inertial measurements $M_{A3}$ are measured in step S120 and sent to the control unit 18, as shown in the block diagram in FIG. 2. In step S140, this calculates the first kinematics data of the agricultural machine 10 on the basis of the first inertial measurements $M_{A1}$. In particular, by numerical integration of the acceleration or angular acceleration, a current velocity and angular velocity as well as a current position and orientation can be calculated, wherein the initial values A are required. Optionally, additional sensor data can be called up in an intermediate step S130, for example, distance data $M_{S1}$ of the first distance sensor 19, to improve the precision of the determined value for the current position, or orientation data $M_O$ of the orientation sensor 13 to improve the precision of the determined orientation. Based on this, an actual lane $R_I$, which is shown in FIG. 3 as a dash-dotted line, of the agricultural machine 10 is calculated as part of the first kinematics data.

Furthermore, in a step S160, which could also be carried out before or at the same time as step S140, lane information related to the guide vehicle 30 is determined on the basis of inertial measurements $M_{A1}$, $M_{A2}$, $M_{A3}$. There are different possibilities for this, which essentially depend on which of the above three options is used. If, in accordance with the first option, only the first inertial measurements $M_{A1}$ are available, a change in the direction of travel of the guide vehicle 30 can be inferred, both qualitatively and quantitatively, in particular from a lateral acceleration of the agricultural machine 10. Here the precision can be improved if at least one of the angle sensors 43, 44, the second distance sensor 34 and/or the position sensors 16 are also included, the measurements of which can be read in during step S130.

If, according to the second option, the second inertial measurements $M_{A2}$ are available, the current position, orientation, velocity, and angular velocity of the guide vehicle 30 can, in principle, be determined by numerical integration on the basis of the determined acceleration and angular acceleration. Here too, improved precision can be achieved by incorporating at least one of the angle sensors 43, 44, the second distance sensor 34 and/or the position sensors 16. If, according to the third option, the third inertial measurements $M_{A3}$ are available, but not the second inertial measurements $M_{A2}$, the current position, orientation, velocity, and angular velocity of the coupling rod 40 can be determined by numerical integration on the basis of the determined acceleration and angular acceleration. In an intermediate step S150, a trajectory of the coupling rod 40 can be determined. By combining this with the known geometry data G of the agricultural machine 10, the guide vehicle 30 and the coupling rod 40, the position, orientation, velocity, and angular velocity of the guide vehicle 30 can be determined from this. Here too, at least one of the angle sensors 43, 44, the second distance sensor 34 and/or the position sensors 16 can be included.

In any case, second kinematics data of the guide vehicle 30 can be determined and, in particular, a calculated lane $R_B$, which is shown in FIG. 3 as a short dashed line. Due to various influences such as measurement errors and numerical errors, the calculated lane $R_B$ deviates partly from the guide lane $R_F$. However, the deviation is minor and does not affect the basic function of the control device 1.

Based on the calculated lane $R_B$, a target lane $R_S$ for the agricultural machine 10 is determined in step S180. In the example shown, this is identical to the calculated lane $R_B$, i.e., it is intended that the agricultural machine 10 is exactly in the lane of the guide vehicle 30. Alternatively, for example a lateral offset would be conceivable in a bend. In a further step S200, the target lane $R_S$ is compared with the actual lane $R_I$ and in step S220 steering commands $L_1$, $L_2$ for the steerable axles 14, 15 are determined depending on the result of the comparison. Of course, these steering commands $L_1$, $L_2$ are used to align the actual lane $R_I$ with the target lane $R_S$. In a further step S240, the agricultural machine 10 is steered by means of the steering actuators 20, 21 according to the steering commands $L_1$, $L_2$. After that, the method returns to step S120, and the described steps are repeated.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 1 | Control device |
| 10 | Agricultural machine |
| 11 | First inertial measuring or sensing device |
| 12 | Two IMUs |
| 13 | Orientation sensor |
| 14 | Front axle |
| 15 | Rear axle |

TABLE 1-continued

| List of Reference Characters | |
|---|---|
| 16 | Position sensors |
| 17 | Rear pivot point |
| 18 | Control Unit |
| 19 | First distance sensor |
| 20 | Front steering actuator |
| 21 | Rear steering actuator |
| 30 | Guide vehicle |
| 31 | Second inertial measuring or sensing device |
| 32 | Two IMUs spaced apart |
| 33 | Front pivot point |
| 34 | Second distance sensor |
| 40 | Coupling Rod |
| 41 | Third inertial measuring or sensing device |
| 42 | Single IMU |
| 43 | First angle sensor |
| 44 | Second or rear angle sensor |
| 50 | First road |
| 51 | Second road |
| A | Initial values |
| G | Geometry Data |
| $L_1$ | First steering command |
| $L_2$ | Second steering command |
| $M_{A1}$ | first inertial measurements |
| $M_{A2}$ | Second inertial measurements |
| $M_{A3}$ | Third inertial measurements |
| $M_O$ | Orientation measurements |
| $M_P$ | Position readings |
| $M_{S1}$ | First distance measurements |
| $M_{S2}$ | Second distance measurements |
| $M_{W1}$, | First angle measurements |
| $M_{W2}$ | Second angle measurements |
| $R_I$ | Actual lane |
| $R_B$ | Calculated lane |
| $R_F$ | Guide lane |
| $R_S$ | Target lane |
| Step S100 | Initialization of the control unit takes place |
| Step S120 | The first inertial measurements $M_{A1}$ and optionally the second inertial measurements $M_{A2}$ and/or the third inertial measurements $M_{A3}$ are measured |
| Step S130 | Optionally, additional sensor data can be called up, for example distance data $M_{S1}$ of the first distance sensor 19, to improve the precision of the determined value for the current position, or orientation data Mo of the orientation sensor 13 to improve the precision of the determined orientation. |
| Step S140 | Calculates the first kinematics data of the agricultural machine 10 on the basis of the first inertial measurements $M_{A1}$ |
| Step S150 | Trajectory of the coupling rod 40 can be determined |
| Step S160 | Lane information related to the guide vehicle 30 is determined on the basis of inertial measurements $M_{A1}$, $M_{A2}$, $M_{A3}$ |
| Step S180 | Based on the calculated lane $R_B$, a target lane $R_S$ for the agricultural machine 10 is determined |
| Step S200 | Target lane $R_S$ is compared with the actual lane $R_I$ |
| Step S220 | Steering commands $L_1$, $L_2$ for the steerable axles 14, 15 are determined depending on the result of the comparison. |
| Step S240 | Agricultural machine 10 is steered by means of the steering actuators 20, 21 according to the steering commands $L_1$, $L_2$ |

Glossary

Unless defined otherwise, all technical and scientific terms used above have the same meaning as commonly understood by one of ordinary skill in the art to which embodiments of the present invention pertain.

The terms “a,” “an,” and “the” include both singular and plural referents.

The term “or” is synonymous with “and/or” and means any one member or combination of members of a particular list.

The terms “invention” or “present invention” are not intended to refer to any single embodiment of the particular invention but encompass all possible embodiments as described in the specification and the claims.

The term “about” as used herein, refers to slight variations in numerical quantities with respect to any quantifiable variable. Inadvertent error can occur, for example, through the use of typical measuring techniques or equipment or from differences in the manufacture, source, or purity of components.

The term “substantially” refers to a great or significant extent. “Substantially” can thus refer to a plurality, majority, and/or a supermajority of said quantifiable variable, given proper context.

The term “generally” encompasses both “about” and “substantially.”

The term “configured” describes a structure capable of performing a task or adopting a particular configuration. The term “configured” can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A steering method for a towed agricultural machine (10) which follows a guide vehicle (30) towing the towed agricultural machine (10) and driving along a guide lane ($R_F$) during a road trip comprising of:

inertial measurements ($M_{A1}$, $M_{A2}$, $M_{A3}$) which correspond at least to a multidimensional acceleration are determined (S120) by at least one inertial measuring unit (11, 31, 41), said multidimensional acceleration comprising two-dimensional or three-dimensional accelerations, wherein the first inertial measurements ($M_{A1}$) are determined by a first inertial measuring (11) arranged on the towed agricultural machine (10), wherein at least first kinematics data that describe the kinematics of the towed agricultural machine (10) and that are based on the first inertial measurements ($M_{A1}$) are determined (S140) and at least partly based on the determined inertial measurements ($M_{A1}$, $M_{A2}$, $M_{A3}$), lane information relating to the guide vehicle (20) is determined (S160) and the first kinematics data are compared with this (S200); and depending on the result of the comparison, steering commands ($L_1$, $L_2$) are automatically determined (S220) for at least one steerable axle (14, 15) of the towed agricultural machine (10) in order to steer the towed agricultural machine (10) in a manner adapted to the guide lane ($R_F$) and the towed agricultural machine (10) is automatically steered (S240) by the steering commands ($L_1$, $L_2$).

2. The steering method according to claim 1, wherein the determined lane information corresponds to a calculated lane ($R_B$) of the guide vehicle (30) and the first kinematic data correspond to an actual lane ($R_I$) of the towed agricultural machine (10), wherein the actual lane ($R_I$) is compared (S220) with a target lane ($R_S$) derived from the calculated lane ($R_B$) and the steering commands ($L_1$, $L_2$) are determined (S220) depending on the result of the comparison.

3. The steering method according to claim 1, wherein the towed agricultural machine (10) is connected to the guide vehicle (30) by a tension and pressure-transmitting coupling rod (40), wherein the coupling rod (40) is pivotably connected to both the guide vehicle (30) and the towed agricultural machine (10).

4. The steering method according to claim 1, wherein the second inertial measurements ($M_{A2}$) are determined by a second inertial measuring unit (31) arranged on the guide vehicle (30) and the lane information is determined at least partly on the basis of the second inertial measurements ($M_{A2}$).

5. The steering method according to claim 1, further comprising of second kinematics data that describe the kinematics of the guide vehicle (30) and are at least based on the second inertial measurements ($M_{A2}$) are determined.

6. The steering method according to claim 1, wherein a third inertial measuring unit (41) arranged on the coupling rod (40) determines third inertial measurements ($M_{A3}$) and the lane information is determined at least partly based on the third inertial measurements ($M_{A3}$).

7. The steering method according to claim 1, further comprising of trajectory information regarding a trajectory of the coupling rod is determined (S150) at least partly on the basis of the third inertial measurement values ($M_{A3}$) and the lane information is at least partly based on the trajectory information.

8. The steering method according to claim 1, wherein the lane information and/or the first kinematics data are determined partly on the basis of geometry data (G) describing a geometry of the guide vehicle (30), the coupling rod (40) and/or the towed agricultural machine (10).

9. The steering method according to claim 1, wherein the lane information and/or the first kinematics data are determined in addition to the inertial measurements ($M_{A1}$, $M_{A2}$, $M_{A3}$) partly based on measurements ($M_P$, $M_O$, $M_{S1}$, $M_{S2}$, $M_{W1}$, $M_{W2}$) of at least one additional sensor (13, 16, 19, 34, 43, 44).

10. The steering method according to claim 1, further comprising of at least one additional sensor (13, 16, 19, 34, 43, 44) is in the form of an angle sensor (43, 44) that determines angle measurements ($M_{W1}$, $M_{W2}$) corresponding to an angle of the coupling rod (40) relative to the guide vehicle (30) and/or the towed agricultural machine (10).

11. The steering method according to claim 10, wherein the at least one additional sensor (13, 16, 19, 34, 43, 44) is in the form of an orientation sensor (13) that determines orientation measurements ($M_O$) corresponding to an orientation of the towed agricultural machine (10), the coupling rod (40) and/or the guide vehicle (30) relative to the surroundings thereof.

12. The steering method according to claim 10, wherein the at least one additional sensor (13, 16, 19, 34, 43, 44) is in the form of a distance sensor (19, 34) that determines distance measurements ($M_{S1}$, $M_{S2}$) corresponding to a distance travelled by the towed agricultural machine (10) and/or the guide vehicle (30).

13. The steering method according to claim 10, wherein the at least one additional sensor (13, 16, 19, 34, 43, 44) is in the form of a position sensor (16) arranged on the towed agricultural machine (10) that determines position measurements ($M_P$) corresponding to a position of the guide vehicle (30) relative to the towed agricultural machine (10).

14. The steering method according claim 1, further comprising of at least one inertial measuring unit (11, 31, 41), has a plurality of inertial measuring units (12, 32, 42) that provide mutually redundant measurements, wherein discrepancies occurring between these measurements are used for error correction.

15. A control device (1) for a towed agricultural machine (10) that is set up to follow a guide vehicle (30) towing the towed agricultural machine (10) and driving along a guide lane ($R_F$) during a road trip, the control device (1) comprising of:

determining (S120) by means of at least one inertial measuring unit (11, 31, 41) inertial measurements ($M_{A1}$, $M_{A2}$, $M_{A3}$) that correspond at least to a multidimensional acceleration, said multidimensional acceleration both two-dimensional and three-dimensional accelerations, wherein the first inertial measurements ($M_{A1}$) are determined by a first inertial measuring unit (11) arranged on the towed agricultural machine (10), wherein first kinematics data based at least on the first inertial measurements ($M_{A1}$) and describing the kinematics of the towed agricultural machine (10) are determined (S140);

determining at least partly based on the determined inertial measurements ($M_{A1}$, $M_{A2}$, $M_{A3}$), (S160) lane information relating to the guide vehicle (20) and comparing (S200) the first kinematics data with this (S160) lane information and depending on the result of the comparison, to automatically determine (S220) steering commands ($L_1$, $L_2$) for at least one steerable axle (14, 15) of the towed agricultural machine (10) in order to steer the towed agricultural machine (10) in a manner adapted to the guide lane ($R_F$); and automatically steering (S240) the towed agricultural machine (10) by the steering commands ($L_1$, $L_2$).

* * * * *